Oct. 14, 1930.  S. A. PARDUE  1,778,370
POULTRY COOP
Filed July 23, 1928
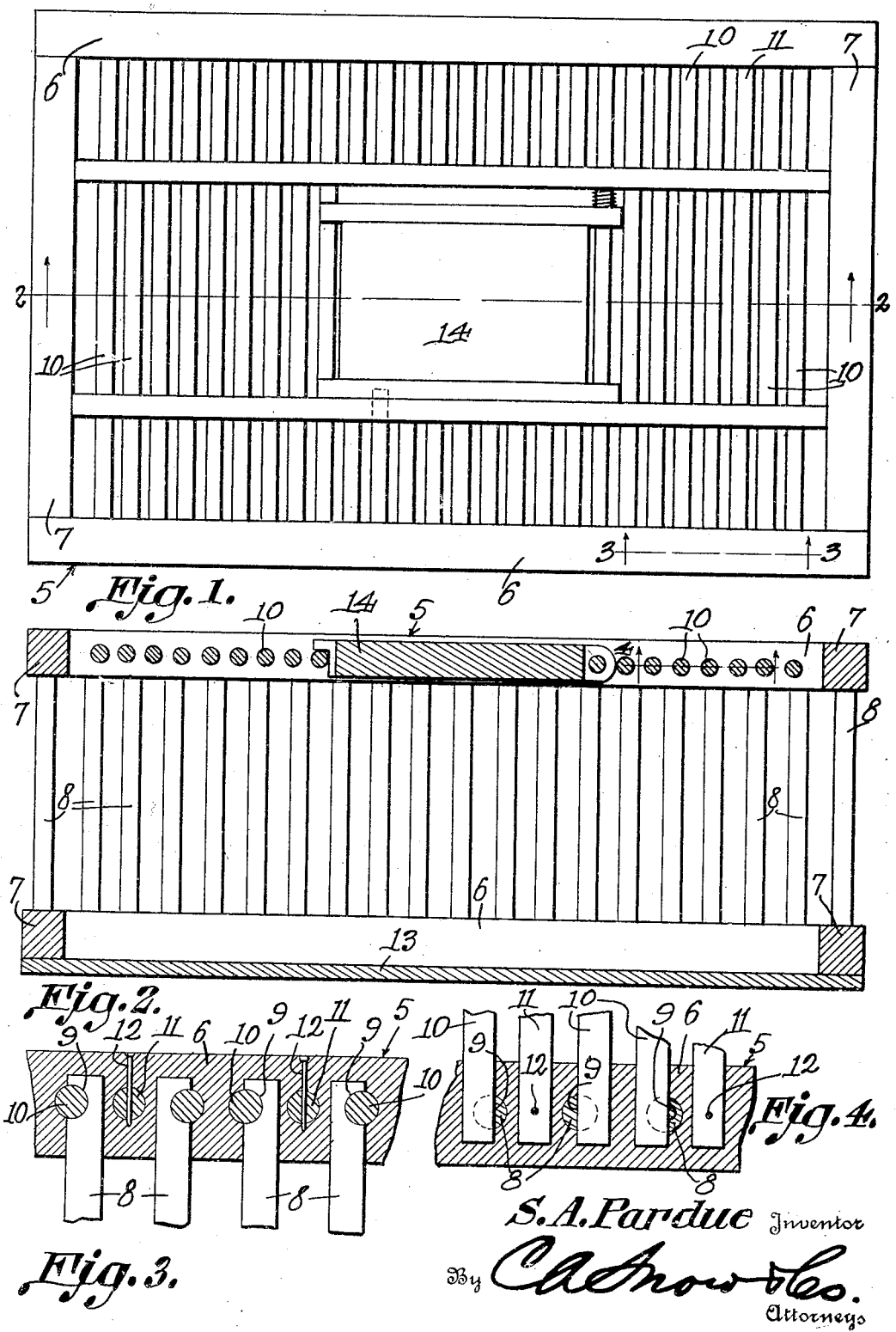

Patented Oct. 14, 1930

1,778,370

UNITED STATES PATENT OFFICE

STEPHEN A. PARDUE, OF OLIN, NORTH CAROLINA

POULTRY COOP

Application filed July 23, 1928. Serial No. 294,639.

This invention relates to open work poultry coops or crates, the primary object of the invention being to provide novel means for connecting the staves or rods forming the sides of the coop or crate, to the side bars of the crate, so that the spaces between the staves or rods will be so restricted that it will be impossible for the poultry in the coop to move their heads through the spaces.

An important object of the invention is to provide means for connecting the staves or rods of the vertical sides of the crate with the staves or rods of the top of the crate, eliminating the use of nails which usually weaken the construction to such a degree that crates held together by nails become loose and often break apart under the weight of the poultry held in the coop, when the coop or crate is being lifted in transit.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a coop or crate constructed in accordance with the invention.

Figure 2 is a sectional view taken on line 2—2 of Figure 1.

Figure 3 is a sectional view taken on line 3—3 of Figure 1.

Figure 4 is a sectional view taken on line 4—4 of Figure 2.

Referring to the drawing in detail, the crate is indicated generally by the reference character 5 and includes upper and lower side bars 6 and upper and lower end bars 7 the side and end bars being connected at their ends defining rectangular upper and lower crate sections.

Bores are formed in the upper surfaces of the side and end bars of the lower section of the crate and receive the lower ends of the rods or staves 8, while the lower surfaces of the side and end bars of the upper section of the crate are formed with bores to receive the upper ends of the rods or staves 8.

As shown, these rods or staves 8 and which form the sides and end of the crate, are formed with cut out portions or notches 9 disposed adjacent to the upper ends thereof for the reception of the ends of the horizontal rods or staves 10 so that the vertical rods or staves 8 are interlocked with the horizontal staves 10, it being understood that the staves 10 pass into openings or bores formed in the inner side faces of the side bars 6 of the upper section, the openings or bores being slightly offset with respect to the bores in the lower surfaces thereof for accomplishing the interlocking result.

Disposed between certain horizontal rods or staves, are staves 11 which extend into bores formed in the inner surfaces of the side bars 6 and are secured by means of the nails 12 to the end that the upper section of the crate is made up of a number of rods or staves arranged in such relation with respect to each other that the spaces will not permit of poultry passing their heads between the rods or staves where they would become injured in shipment.

It will be seen that due to this construction the crate will not pull apart when lifted by the side bars of the upper section of the crate, the interlocking feature of the rods or staves forming the open work of the crate, holding the sections of the crate together and may only be removed by knocking the crate apart.

The bottom of the crate is indicated by the reference character 13 and may be of any desired construction. An entrance opening is provided in the upper section of the crate which entrance opening is closed by the hinged closure 14, as clearly shown by Figure 1.

I claim:

1. A shipping crate for poultry including an upper section and a lower section, vertical staves connecting the upper and lower sections, the ends of the staves extending into openings formed in the upper and lower sections, said staves having lateral cut out portions adjacent to their upper ends, horizontal staves extending into openings in the inner sides of the upper section and fitted in the lateral cut out portions of the vertical staves to hold the sections together.

2. A shipping crate for poultry including an upper and lower section, vertical staves for connecting the upper and lower sections, horizontal staves forming a part of the upper section, the ends of the horizontal staves and vertical staves interlocking to hold the sections together, and a bottom for the crate.

3. A shipping crate for poultry including an upper section and a lower section, vertical staves extending into bores of the upper and lower sections for connecting the upper and lower sections, and horizontal staves interlocking with the vertical staves to lock the staves in the sections.

4. A shipping crate for poultry including an upper section and a lower section, vertical staves connecting the upper and lower sections, said upper section having bores formed in the under surface thereof and having bores formed in the inner surfaces thereof intersecting the bores in the under surface thereof, staves having their ends extending into the bores, said staves having interlocking ends and horizontal staves nailed to the upper section.

5. A shipping crate for poultry including an upper section and a lower section, said sections comprising side and end bars, said side and end bars of the upper section having bores formed in the under surfaces thereof and having bores formed in the inner surfaces thereof, vertical staves arranged in pairs and extending into the bores in the under surfaces of the side bars, horizontal staves connecting the side members of the upper section and extending into the bores formed in the inner surfaces of the side bars and interlocking with the first mentioned staves, and horizontal staves between certain of the staves of the upper section, the last mentioned staves being nailed to the side bars.

In testimony that I claim the foregoing as my own, I have hereto affixed my signature.

STEPHEN A. PARDUE.